United States Patent [19]

Cooper et al.

[11] 3,868,652

[45] Feb. 25, 1975

[54] MULTI-LAYER FERROELECTRIC OPTICAL MEMORY SYSTEM

[75] Inventors: Lawrence Cooper, Endwell; Lawrence B. Ii; David C. T. Shang, both of, Apalachin, all of N.Y.

[73] Assignee: International Business Machines Corporation, Armonk, N.Y.

[22] Filed: June 18, 1973

[21] Appl. No.: 371,227

[52] U.S. Cl.. 340/173 LM, 340/173 LS, 340/173.2, 340/173 MS

[51] Int. Cl. .......... G11c 11/42

[58] Field of Search.... 340/173.2, 173 LM, 173 LS, 340/173 LT

[56] References Cited

UNITED STATES PATENTS

| | | | |
|---|---|---|---|
| 3,229,261 | 1/1966 | Fatuzzo | 340/173.2 |
| 3,693,171 | 9/1972 | Asam | 340/173.2 |
| 3,701,122 | 10/1972 | Geusic | 340/173.2 |
| 3,740,734 | 6/1973 | Maldonado | 340/173.2 |

*Primary Examiner*—Terrell W. Fears

*Attorney, Agent, or Firm*—Norman R. Bardales

[57] ABSTRACT

An optical memory system utilizes a multi-layer ferroelectric optical memory or storage apparatus. Storage apparatus has plural storage locations, each of which includes a mutually-exclusive discrete region in each of the ferroelectric layers. The regions associated with a particular storage location are in optical coupling relationship with each other. Means are provided for selectively setting the birefringent level associated with each region of each storage location of each ferroelectric layer. The birefringent levels collectively set for the regions of each particular storage location are indicative of the digital information being stored in the particular storage location. The information is thus stored according to spatial and color criteria, i.e. in three dimensions. The memory system can be operated in conventional and/or in alterable read-only memory modes. In addition, the apparatus has low voltage switching characteristics.

8 Claims, 8 Drawing Figures

MULTI-LAYER FERROELECTRIC OPTICAL MEMORY SYSTEM

CROSS-REFERENCE TO RELATED APPLICATIONS

In the system described in the present application, there is shown as a component thereof multi-layer ferroelectric optical storage apparatus which employs some of the principles of the invention of the U.S. patent application, Ser. No. 371,224, which is incorporated herein by reference, of Lawrence B. Ii and David C.T. Shang, two of the co-inventors herein, entitled "Multi-layer Ferroelectric Apparatus", filed June 18, 1973 concurrently herewith and assigned to the same assignee of the present invention.

BACKGROUND OF THE INVENTION

1. Field of the Invention

This invention is related to optical memory systems and in particular to optical memory systems of the ferroelectric type.

2. Description of the Prior Art

Optical memory systems utilizing ferroelectric memory devices are well known in the art. Heretofore, in the prior art, these ferroelectric memory devices generally controlled the intensity of the light being transmitted through it to represent the binary states. In one convention, for example, if the light passes through the device the information represents a binary 1, and if no light passes through it the information represents a binary 0. Thus, for any given storage location of the memory the information was processed by the memory in one binary form. The prior art devices were hence not conducive to having the information transmitted in other digital forms.

Moreover, the prior art devices generally were of the bulk type. The use of bulk ferroelectric devices requires high switching voltages.

The high voltage switching requirements of the prior art devices are disadvantageous. They require high operating voltages with a concomitant increase in power requirements. They create potential hazardous conditions in operation and maintenance due to the high potentials. Moreover, the use of such high voltage potentials is not compatible or conducive to use of such prior art devices with the relatively lower voltage potentials used in integrated circuit technology such as, for example, CMOS and the like.

SUMMARY OF THE INVENTION

An object of this invention is to provide a ferroelectric optical memory system having a selectable and controllable wavelength bandpass characteristic in accordance with the digital information to be stored therein.

Another object of this invention is to provide a ferroelectric optical memory system having low voltage switching characteristics.

Another object of this invention is to provide ferroelectric optical memory systems which are economical to operate and/or are relatively safe.

Another object of this invention is to provide a ferroelectric optical memory system which can be operated in sequential and/or random access modes.

Still another object of this invention is to provide a three-dimensional ferroelectric optical memory system.

Still another object of this invention is to provide a ferroelectric optical memory system that stores the information according to spatial and color criteria, and/or which is capable of operation in conventional and/or alterable read-only memory modes.

Still another object of the invention is to provide a memory system which is non-volatile.

According to one aspect of the invention, an optical memory system apparatus is comprised of optical storage means having plural storage locations for storing digital information. The storage means includes a plurality of spaced conductive members and a plurality of ferroelectric member means interleaved between the conductive members. Each of the storage locations includes a mutually-exclusive discrete region in each of the ferroelectric member means. Also, each storage location has its associated regions in optical coupling relationship with each other. Means are provided for selectively setting the birefringent level in each storage region of each ferroelectric member means. The birefringent levels set for the regions of each particular storage location are indicative of the digital information being stored in the particular storage location. Also provided are detecting means for optically detecting the birefringent levels of the regions associated with each storage location to determine the stored digital information.

The foregoing and other objects, features, and advantages of the invention will be apparent from the following more particular description of the preferred embodiments of the invention, as illustrated in the accompanying drawing.

BRIEF DESCRIPTION OF THE DRAWING

In the Figures, like elements are designated with similar reference numerals.

DESCRIPTION OF THE PREFERRED EMBODIMENT

Figure 1:
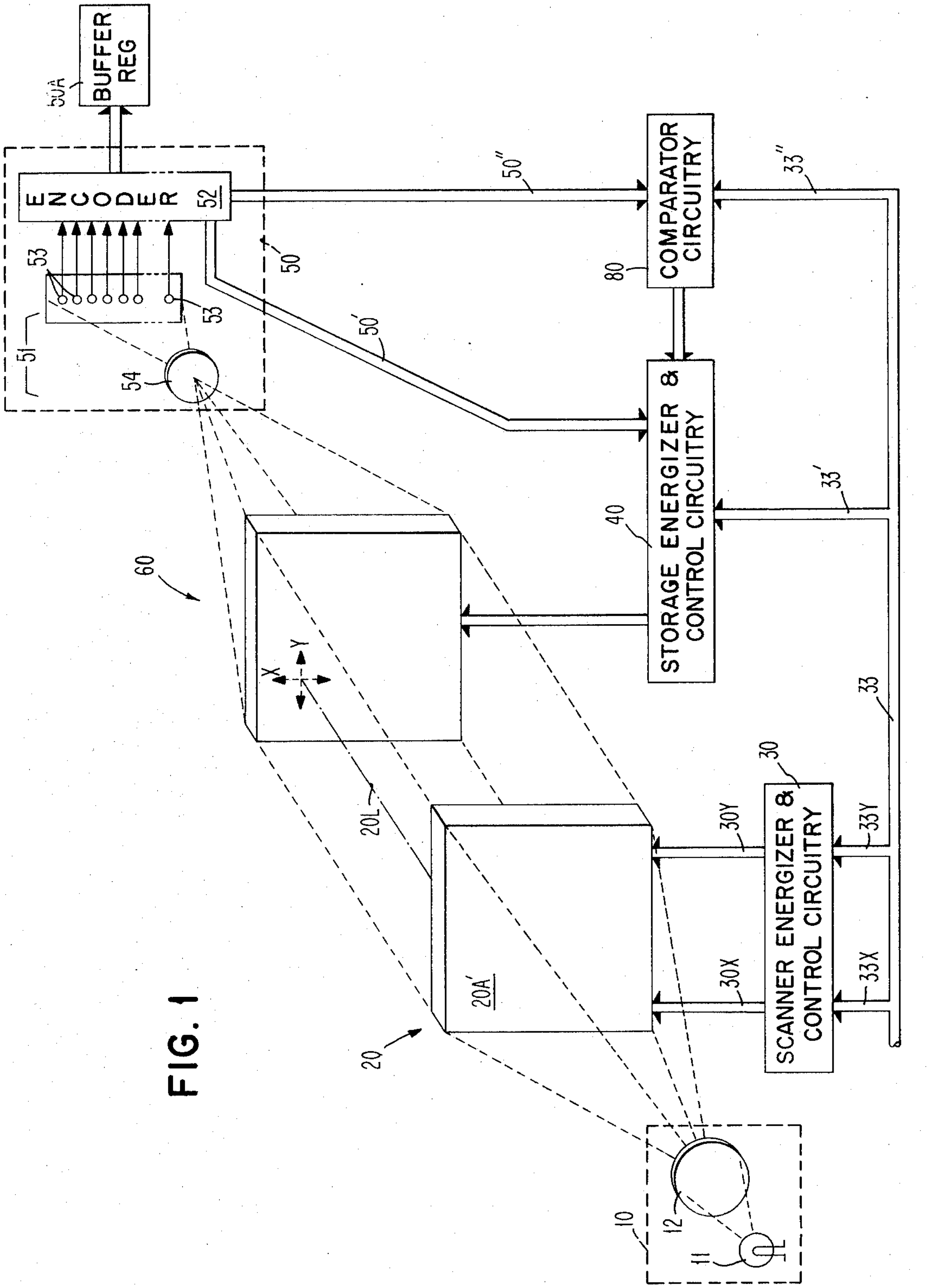
FIG. 1 is a schematic view shown partially in perspective and block form of a preferred embodiment of the present invention.

The aforedescribed selectively setting means, detecting means, and optical storage means of the preferred embodiment of the optical memory system of the present invention shown in FIG. 1 are generally designated therein by the reference characters 10–40, 50, and 60, respectively.

Referring in greater detail to FIG. 1, the selectively setting means includes a light source 10, which provides collimated light that illuminates the frontal surface 20A' of the scanner 20. The collimated light from source 10 has a spectral content compatible to the spectral levels utilized in the optical storage means 60, as hereinafter described in greater detail. For example, if the aforementioned color levels are to be in the red and near red regions, a tungsten lamp having an appropriate spectral content characteristic in the range between 7,000 to 9,000 Angstroms may be employed. If the levels to be employed in the means 60 are in the entire visible spectrum, i.e. from blue to red or near red, then a Xenon lamp having a flat and broad spectral characteristic in the range covered by the visible spectrum may be employed, by way of example. As shown schematically in FIG. 1, light source 10 includes a lamp 11 and collimating lens system 12.

Light scanner 20 converts the collimated light from source 10 incident to its frontal surface 20A′ to a narrow cross-sectional beam 20L of collimated light. The light beam 20L scans the storage means 60 in a predetermined scan pattern. For sake of explanation, an X-Y raster type scan is used to simplify the description.

Figure 2:
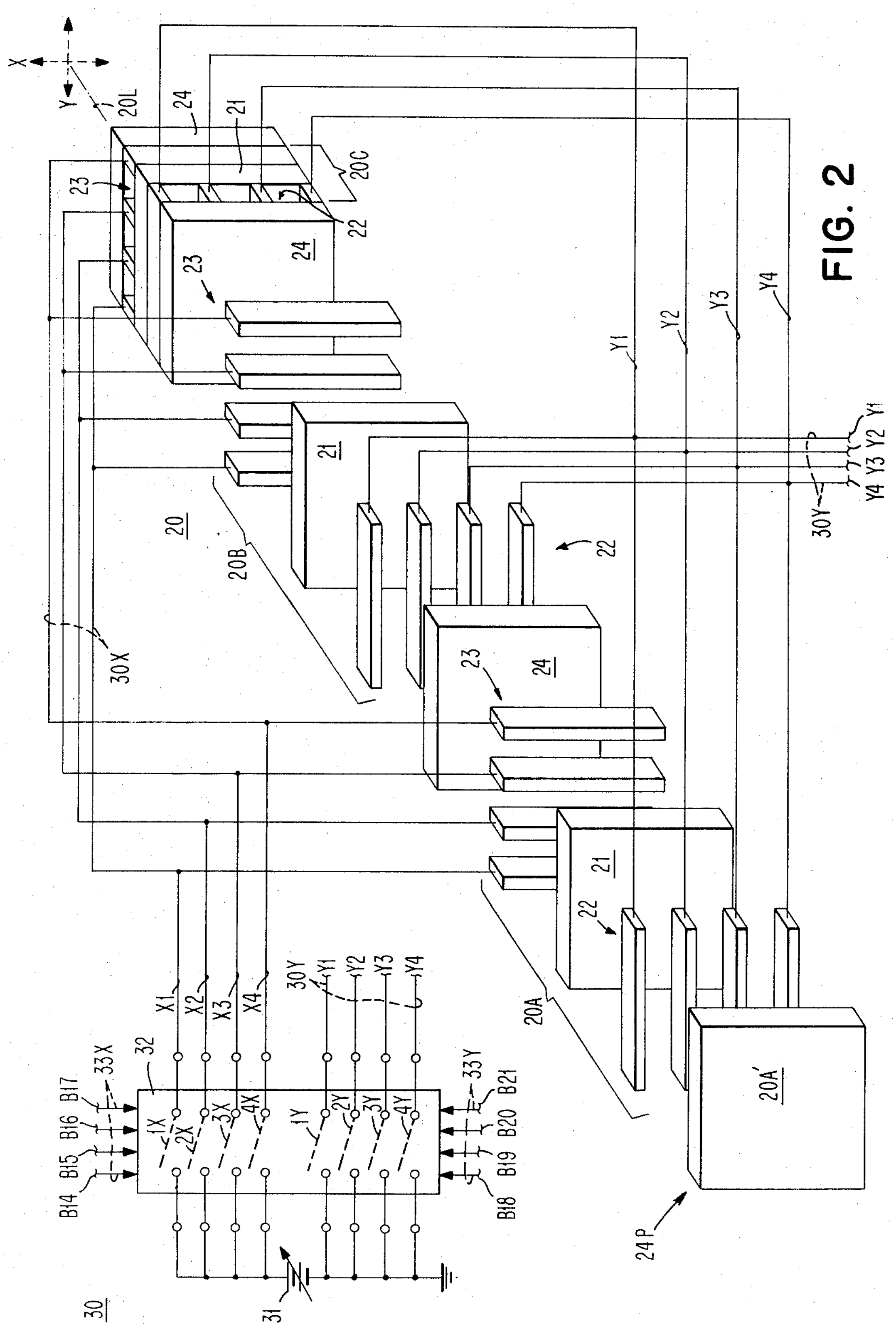
FIG. 2 is a schematic view shown partially in perspective and block form of a preferred light scanner component used in the apparatus of FIG. 1.
Figure 3:
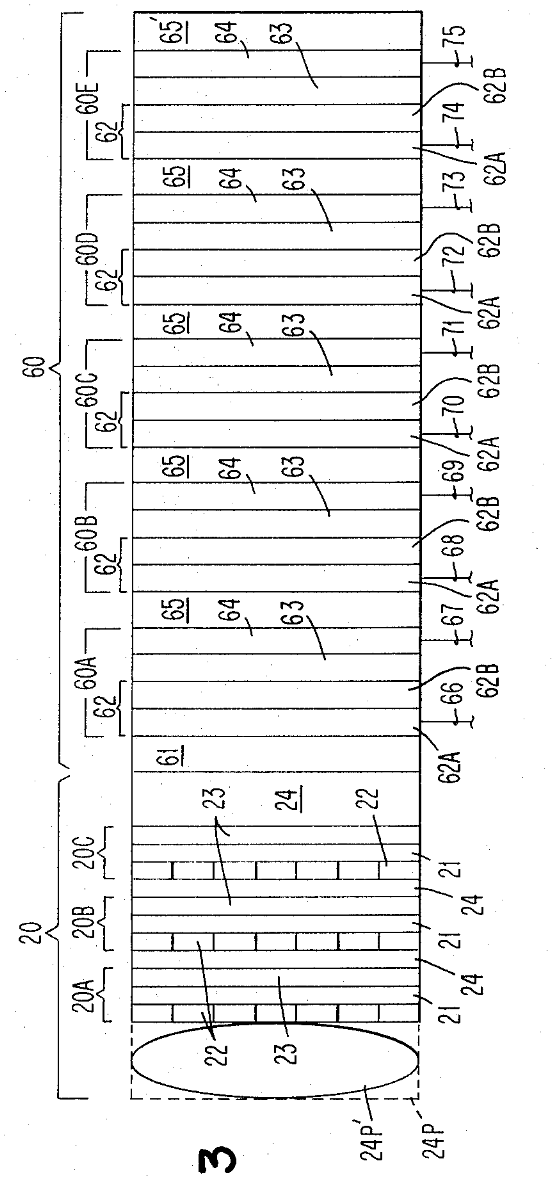
FIG. 3 is a schematic side view of the scanner and optical storage components of the apparatus of FIG. 1.

Preferably, as shown in greater detail in FIGS. 2 and 3, the light scanner 20 is comprised of three identical parallel operated sections, 20A, 20B and 20C. Each of the sections 20A, 20B, 20C includes a ferroelectric member 21 which is interleaved between two sets 22, 23 of transparent electrodes. Each of the sets 22, 23 contains a plurality of parallel electrodes. For sake of simplicity, each of the sets 22, 23 is shown in FIG. 2 as having only four electrodes. The parallel electrodes of sets 22 are orthogonal to the parallel electrodes of sets 23. The elements 21–23 of each of the sets 20A–20C are aligned with the corresponding elements of the other sets, the elements of sections 20A and 20B being shown in exploded view form in FIG. 2 for sake of clarity. The electrodes between adjacent sets are electrically isolated from each other by insulator members 24. The domains of ferroelectric layers 21 of sections 20A–20C are poled in such a manner so as to co-act with the optical polarizer 24P as an analyzer during their formation. The domain alignment is orthogonal to the polarizer axis and may be induced electrostatically during its formation. By providing multiferroelectric layers 21, lower switching or energizing voltages are required. The layers 21, when energized, as hereinafter described, act as an optical switch.

The elements of the light scanner 20 may be fabricated by using sputtering or chemical vapor deposition techniques. Preferably, the polarizer 24P and analyzers 21 are fabricated as an integral unit. Alternatively, the polarizer 24P may be an independent member with respect to the rest of the elements of scanner 20. This last mentioned alternative case thus allows the aforementioned polar axes to be adjustable with respect to each other. By way of example, the polarizer is shown in two alternative forms in FIG. 3, to wit: as an integral member 24P indicated by the dash lines therein, and as a separable member shown by the schematically shown optical member 24P′.

Corresponding electrodes of the same sets 22, 23 are connected in parallel and in turn are connected to the respective conductors designated X1–X4 and Y1–Y4 of multi-conductor cables 30X, 30Y, respectively, from the selectable energizing source 30. As shown schematically in FIG. 2, the energizer source 30 includes a voltage source indicated by the adjustable battery 31, having, by way of example, its positive terminals adapted to be connected to the parallel connected sets 23 of X electrodes and its negative terminal connected to the parallel connected sets 22 of Y electrodes via the electronic switching circuitry 32. More specifically, for sake of clarity, the electronic switches of circuitry 32 are schematically shown in FIG. 2 in phantom outline form and are designated therein by the reference characters 1X–4X and 1Y–4Y. The electronic switches 1X–4X are operated by control signals designated B14–B17, respectively, and the electronic switches 1Y–4Y are controlled by the control signals designated by the reference characters B18–B21, respectively. The signals B14–B21 are provided by a data information source such as, for example, a programmable general purpose CPU, not shown, and are fed to the respective control inputs of circuitry 32 via the respective multi-conductor cable branches 33X, 33Y of multi-conductor cable 33, cf. FIG. 1. In operation, switches 1X–4X and 1Y–4Y are normally open. For the given example of a four-by-four raster type scan, switches 1X–4X are closed and opened in sequence by the control signals during a first time period during which the switch 1Y is closed. At the completion of the first time period, the switch 1Y is opened. During the next time period, the switches 1X–4X are again operated in sequence while the switch 2Y is closed, the latter being opened at the end of the second time period. Likewise, switches 1X–4X are sequentially operated during each of successive third and fourth time periods and during which third and fourth periods the switches 3Y and 4Y are actuated, respectively.

Only the regions of the ferroelectric member 21 lying immediately between the coincidently energized conductors of the sets 22 and 23 with which it is associated, will pass the collimated and analyzed light derived from the source 10 and polarizer 24P. Thus, the light emerges from the scanner 20 as a beam 20L of collimated light in sequence from each X-Y location formed by the intersecting and coincidently sequentially energized X and Y electrodes of the sets 22 and 23. This causes the beam 20L of light to scan the storage locations, hereinafter described, of the optical storage means 60. Elements 10–30 of the selectively setting means co-act with the energizer and control circuitry 40 of the selectively setting means to set the birefringent levels of the storage locations of the optical memory means 60, next to be described.

Referring now to FIG. 3, there is schematically shown in greater detail the ferroelectric optical storage means 60 of FIG. 1. By way of example, it includes five identical sections 60–60E which are built up on a supporting transparent substrate 61 that also acts as an insulator by sputtering or chemical vapor deposition techniques. Additional insulators 65 are formed between the sections 60A–60E, as well as one insulator 65′ that is formed on the open end of section 60E. Insulator 65′ is also an optical analyzer and coacts with the polarized light beam which emerges from scanner 20. Preferably, as shown in FIG. 3, the scanner 20 and storage means 60 are formed as an integral body, scanner 20 and means 60 being shown in exploded form in FIG. 1, for sake of clarity. As such, the domains of the analyzerinsulator 65′ during fabrication are aligned electrostatically so that its respective polar axis is normal to the polar axis of polarized light coming from scanner 20 and with which it co-acts. Alternatively, the analyzer 65′ may be an independent member with respect to the rest of the integrally formed elements of storage means 60 so that its polar axis may be adjusted with respect to the polar axis of polarized light coming from scanner 20. Alternatively, the domains of the layers 63 may be poled electrostatically during their formation so that layers 63 co-act with the polarized light of scanner 20 to act as an analyzer.

For sake of clarity, only section 60A is described in detail. It should be understood, the other sections 60B–60E are configured identical to section 60A. Briefly, section 60A comprises a ferroelectric member 63 interleaved between a pair of transparent conductive member means 62 and 64. One of the conductive member means 62, 64 of the pair, namely, conductive member means 62, is comprised of a transparent conductive layer 62A and a layer having a light responsive impedance such as a photoconductive layer 62B. The other one of the pair, namely conductive member means 64, is a single transparent conductive layer. Layers 62A and 64 act as electrode contacts. As will be apparent to those skilled in the art from the description hereinafter, the photoconductive layer 62B may be disposed on the other side of the layer 63, that is, between layers 63 and 64.

The electrode contacts, i.e. layers 62A and 64, of the respective sections 60A–60E, are connected to respective ones of the conductive leads 66–75, which in turn are connected to selective energizing circuitry 40, cf. FIG. 1. Component 60 is the subject matter of an embodiment of the invention described in the aforementioned co-pending application and shown in FIGS. 11–12 thereof. For sake of clarity, the elements of component 60 are designated herein with the identical reference characters used for the corresponding elements in the aforementioned co-pending application.

Detecting means 50, cf. FIG. 1, senses the light of beam 20L after it passes through the ferroelectrical optical storage means 60. It includes an electro-optical storage means 60. It includes an electro-optical transducer system 51, which provides output electrical signals indicative of the spectral content of the light beam 20L after it passes through the storage means 60. By way of example, the transducer system 51 is schematically shown in FIG. 1 as comprising an encoder 52 and an array of photoconductive diodes 53. Storage means 60 is capable of storing digital information in each of its storage locations corresponding to, for example, 16 different color or spectral frequencies. Accordingly, there are 16 photoconductive diodes 53 in the array, each having a mutually-exclusive optical bandpass response compatible to one of the 16 color frequencies associated with the storage means 60. Schematically shown lens system 54 focuses the light beam emerging from storage means 60 onto the array 53. If desired, an incoherent fiber optic bundle, not shown, may be disposed between lens system 54 and diodes 53. Lens system 54 focuses the light beam frcm means 60 on one end of the bundle. Each of the fiber optic elements of the bundle at the other end are juxtaposed to a mutually-exclusive one of the diodes 53 so as to provide a more efficient coupling to the diode array. It should be understood, that alternatively, the optical lens system 54 may be obviated such as in cases where the array of diodes 53 is in exclusive optical coupling relationship with the light from the storage means 60. The output signals of the diodes 53 are fed to an encoder 52 which converts the input signals to an appropriate digital code such as, for example, a four-bit digital code. The output of encoder 52 in turn is fed to appropriate output means 50A such as a buffer register.

As also contemplated by the present invention, the optical memory system thereof is readily adapted to verification of the information stored in the optical storage means 60. By way of example, after the information is stored in storage means 60 in response to data bits which are supplied by a data source such as the aforementioned CPU, not shown, and which are applied on appropriate conductors of the multi-conductor cable branch 33' of cable 33, it is detected by the detecting means 50. The resultant output of detector 50, cf. multi-conductor cable 50'', and the input data bits on multi-conductor cable 33'' are compared by the comparator circuitry 80 to verify if the storage means 60' contains the correct information. Circuitry 80 may also include self-correcting circuits for appropriately controlling the circuitry 40 whenever a discrepancy in the data from the information source and the detecting means 50 is discerned by the comparator of circuitry 80. The energizer and control circuitry 40 in response to the self-correcting signals of circuitry 80 will appropriately provide the correct level and energization pulses to the storage means 60 which in turn would provide the appropriate color level at the particular storage location of means 60 corresponding to the desired information to be stored. The details of the circuitry 40 and the overall operation of the system of FIG. 1 will next be described with reference to FIGS. 4–8.

Figure 4:
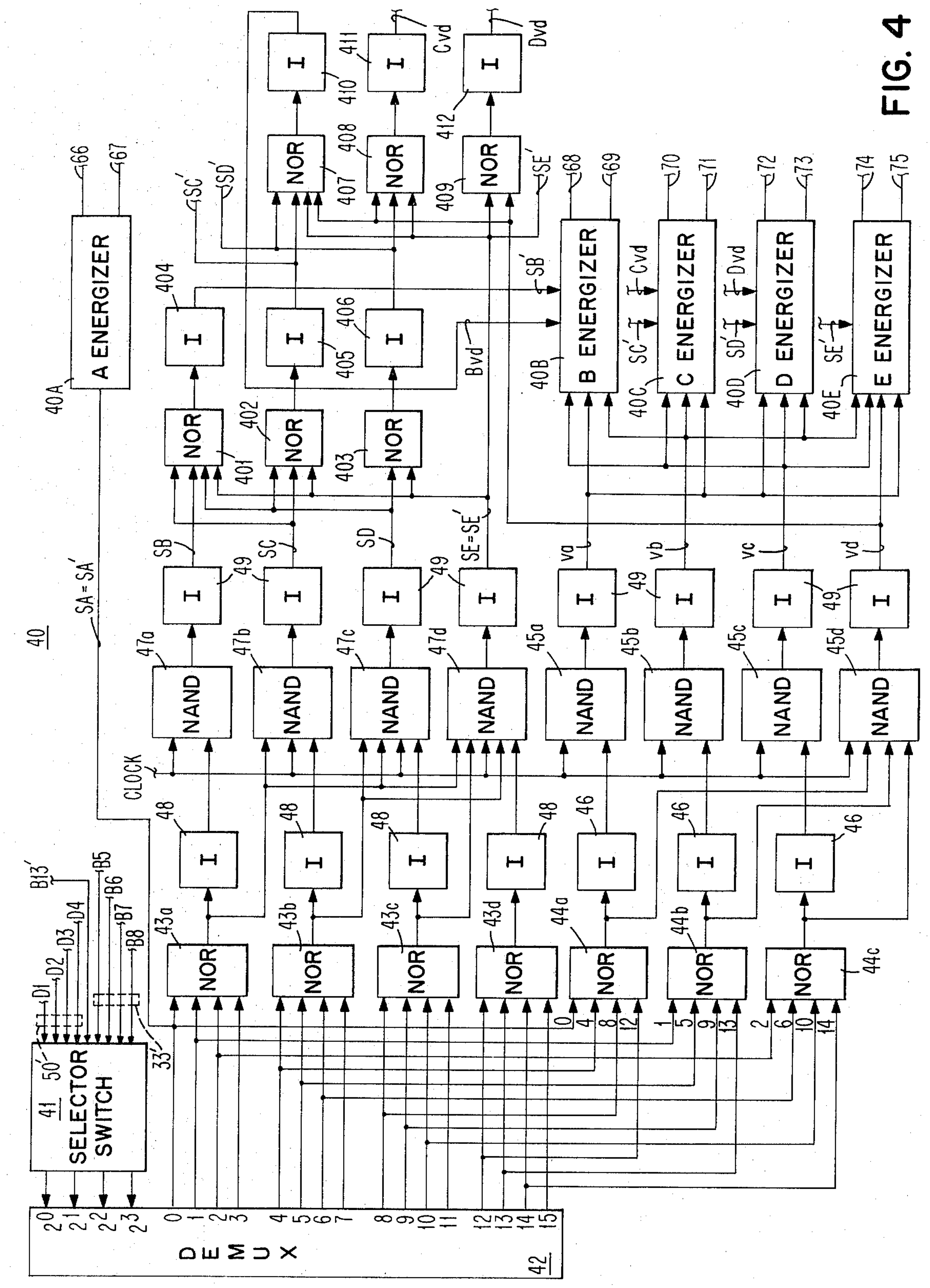
FIG. 4 is a schematic block diagram of certain circuit components of the apparatus of FIG. 1.

As shown in FIG. 4, channel selector switch 41 selectively channels the data bits D1–D4 and B5–B8 from encoder 52 and aforementioned data information source, respectively, via the multi-conductor cables 50' and 33', respectively. Selector switch 41 is controlled by an appropriate control signal B13, which is derived from a signal B13, hereinafter described. In the given example, the information is represented by a four-bit digital code. Accordingly, the output of the channel selector switch 41 is fed to a four input demultiplexer 42, identified by the legend DEMUX. The latter has 16 discrete outputs 0–15 representing the 16 possible states 0 to 15 associated with the four-bit code.

By way of example, logic of the type referred to as TTL is used in the circuitry 40. As contemplated by the present invention, and for the given example, each storage location region of a ferroelectric layer 63 which is associated with the particular sections 60B–60E is capable of being energized by an energization pulse of four different selectable voltage levels by the bipolar energizers 40B–40E which are shown in block form in FIG. 4. For sake of explanation, the four voltage levels are identified with general reference characters V*a*, V*b*, V*c*, V*d*. The storage regions of the layer 63 of section 60A is preferably energized by an energization pulse having a single voltage level which is provided by the unipolar energizer 40A. This single voltage level provides a reference birefringent level or hence reference color for means 60. However, if the reference birefringent level is not desired, section 60A and its energizer 40A may be obviated.

Figure 7:
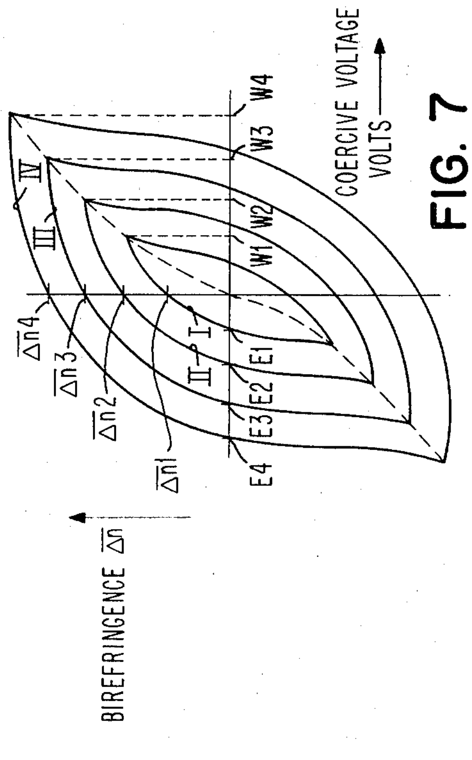
FIGS. 6 and 7 are waveform diagrams helpful in the explanation of the operation of the apparatus of FIG. 1.
Figure 5:
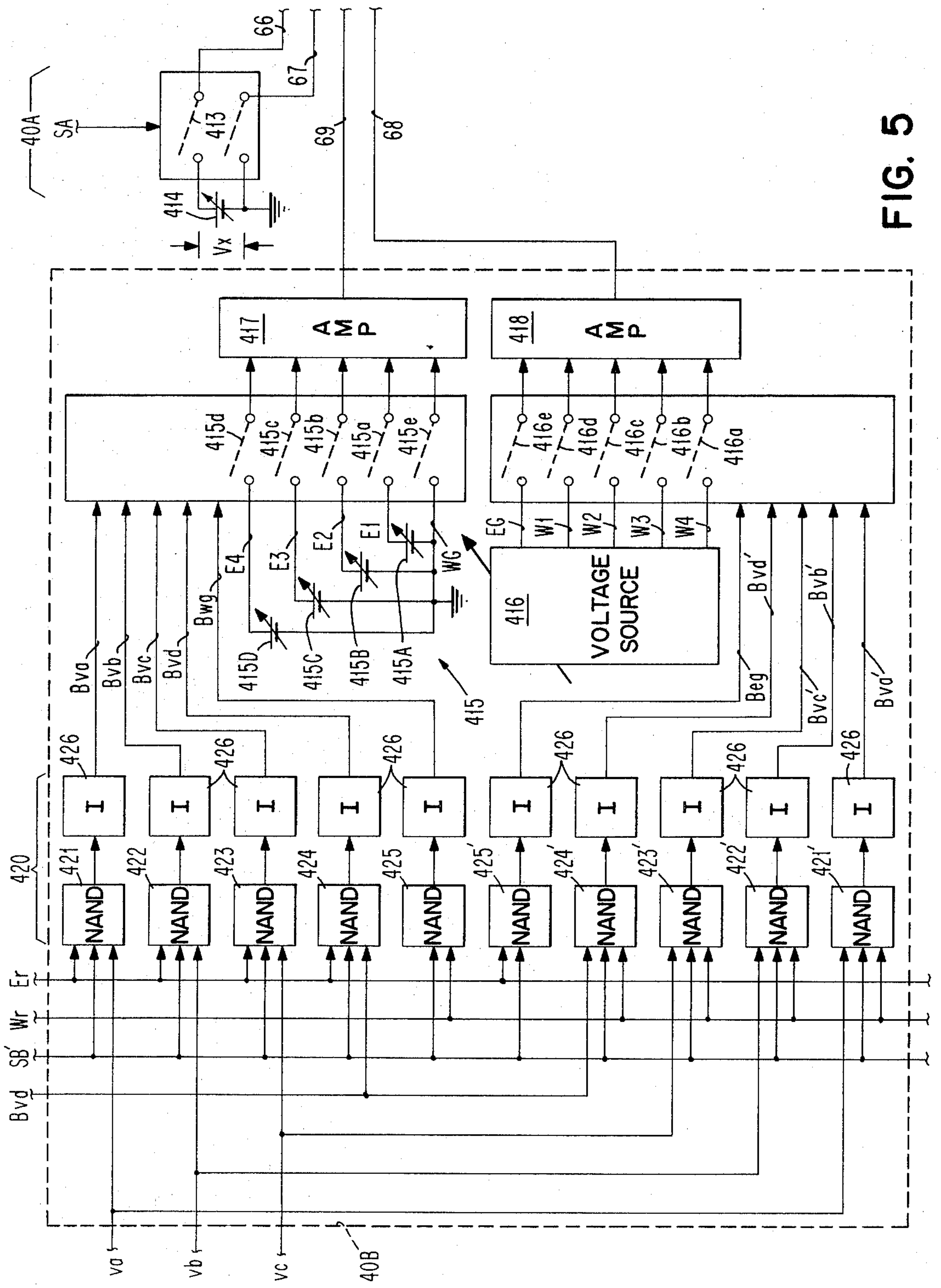
FIG. 5 is a detailed schematic of one of the blocks of FIG. 4.

Referring to FIG. 7, there is shown four idealized waveforms associated with the family of ferroelectric hysteresis loops for a storage region of one of the layers 63. If a positive voltage pulses of level W1 is applied to the electrodes 62A and 64 across the particular storage region of layer 63, then the region will exhibit a residual or remnant birefringent level $\overline{\Delta n 1}$. Likewise, applying positive voltage pulse of levels W2, W3, W4 across a particular region will provide residual birefringent levels $\overline{\Delta n2}$, $\overline{\Delta n3}$, $\overline{\Delta n4}$, respectively. To remove the residual birefringent levels $\overline{\Delta n1}$, $\overline{\Delta n2}$, $\overline{\Delta n3}$, $\overline{\Delta n4}$, that is return them to a zero level, opposite polarity voltage levels E1, E2, E3, E4, respectively, are applied across the particular region of the layers 63. Ideally, if $$|W1| = |E1|,\ |W2| = |E2|,\ |W3| = |E3|, \text{ and/or } |W4| = |E4|°$$

the associated energizer circuit could be modified to provide electronic switching means for reversing the polarity. From a practical viewpoint, the last mentioned voltage magnitude relationships are not equal, and hence, require separate voltage sources as shown in FIG. 5 and explained hereinafter. For sake of simplicity, the aforementioned voltage levels V*a*, V*b*, V*c*, V*d* are applied generally to represent either the write set of levels W1, W2, W3, W4, respectively, or the erase set of levels El, E2, E3, E4, respectively.

As is well known in the art, the different birefringent levels correspond to different angles of retardation which will be exhibited between the ordinary and extraordinary components of the polarized light beam as it passes through the particular region of the ferroelectric layer 63. In turn, these different angles of retardation correspond to different colors. By judiciously selecting and assigning energization levels to each of the layers 63 of sections 60B–60E, the 16 different colors can be obtained. By way of example, there is shown in Table I an assignment of the four voltage levels V*a*–V*d* through the sections 60B–60E corresponding to the 16 possible states, and hence, 16 possible colors in the given example and which is as follows:

TABLE I

| No. | Binary $2^3 2^2 2^1 2^0$ | Voltage Level 60A | 60B | 60C | 60D | 60E |
|---|---|---|---|---|---|---|
| 0 | 0 0 0 0 | V*x* | V*a* | 0 | 0 | 0 |
| 1 | 0 0 0 1 | V*x* | V*b* | 0 | 0 | 0 |
| 2 | 0 0 1 0 | V*x* | V*c* | 0 | 0 | 0 |
| 3 | 0 0 1 1 | V*x* | V*d* | 0 | 0 | 0 |
| 4 | 0 1 0 0 | V*x* | V*d* | V*a* | 0 | 0 |
| 5 | 0 1 0 1 | V*x* | V*d* | V*b* | 0 | 0 |
| 6 | 0 1 1 0 | V*x* | V*d* | V*c* | 0 | 0 |
| 7 | 0 1 1 1 | V*x* | V*d* | V*d* | 0 | 0 |
| 8 | 1 0 0 0 | V*x* | V*d* | V*d* | V*a* | 0 |
| 9 | 1 0 0 1 | V*x* | V*d* | V*d* | V*b* | 0 |
| 10 | 1 0 1 0 | V*x* | V*d* | V*d* | V*c* | 0 |
| 11 | 1 0 1 1 | V*x* | V*d* | V*d* | V*d* | 0 |
| 12 | 1 1 0 0 | V*x* | V*d* | V*d* | V*d* | V*a* |
| 13 | 1 1 0 1 | V*x* | V*d* | V*d* | V*d* | V*b* |
| 14 | 1 1 1 0 | V*x* | V*d* | V*d* | V*d* | V*c* |
| 15 | 1 1 1 1 | V*x* | V*d* | V*d* | V*d* | V*d* |

In the above table, the voltage levels have the following relationships, to wit: V*x*=V*d* approximately for example, and V*d*>V*c*>V*b*>V*a*>0.

Thus, if it were desired to set the collective residual birefringent level of the means 60 to a first color, e.g. blue, which is above the frequency of the reference color established by the level V*x* applied to layer 60A, an energization pulse of level and polarity V*a*=W1 is momentarily applied across the storage region of layer 63 of section 60B coincidentally as the polarized light beam is addressing the particular storage location. Light scanner 20 forms the polarized light beam. The energizing pulse of level Va is synchronized with the application of the light beam addressing the particular storage region. Similarly, to produce each of the next three succeeding ascending longer wavelength colors of the sixteen color sequence example, energization pulses V*b*=W2, V*c*=W3, V*d*=W4 are applied respectively across the regions of layer 63 of section 60B. It should be understood that in response to the light beam becoming incident to the photoconductive layers 62B of sections 60A–60E, the impedance in the immediate region of each layer 62B which is illuminated by the light beam is lowered and thus allows any voltage appearing across the particular layers 62A and 64 to be localized exclusively across the particular region of the associated ferroelectric member 63. Thus, when voltage pulses V*a*=W1, V*b*=W2, V*c*=W3, V*d*=W4 are applied to section 60B, the remnant birefringent levels of its layer 62B, and hence, means 60 will correspond to the first four numbers 0–3 and first four colors, respectively. The light beam then passes through the other transparent members of means 60 and the other sections 60C–60E are not energized. For the next four numbers 4–7, the voltage pulses of levels W1–W4, respectively are applied to the section 60C simultaneously with the application of an energization pulse of level W4 to section 60B. The next four numbers 8–11, and hence, next four colors are obtained by applying pulses of levels W1–W4, respectively, to the section 60D while simultaneously applying energization pulses W4 to sections 60B and 60C.

For the next four numbers corresponding to the numbers 12–15, energization pulses of levels W1–W4, respectively, are applied to the section 60E while simultaneously energization pulses of level W4 are being applied to the other sections 60B–60D. Thus, for example, if it were desired to write the number 15, in a particular storage location of means 60, energization pulses W4 would be simultaneously applied to the sections 60B–60E with the application of the polarized light beam to the particular storage location. The extraordinary component of the light ray as it sequentially passed through each of the ferroelectric layers 63 of sections 60B–60E would be further deviated from the ordinary ray component resulting in an overall angle of retardation which when passed through the analyzer 65' would have a spectral content in the red band, for example.

Returning now to the description of FIG. 4, the outputs 0–15 of multiplexer 42 are arranged in four groups 0–3, 4–7, 8–11, and 12–15, and which groups are nored by the respective nor gates **43*a*–43*d*. The outputs 0, 4, 8 and 12 are arranged in another group and nored by the nor gate 44*a*. The outputs 1, 5, 9, 13 are nored by the nor gate 44*b*, and the outputs 2, 6, 10 and 14 are nored by the nor gate 44*c*. Nand gates 45*a*, 45*b* and 45*c* nand the outputs of nor gates 44*a*, 44*b*, 44*c*, respectively, via their respective inverters 46. Nand gate 45*d* nands the outputs of the three nor gates 44*a*–44*c* and thus, by process of elimination provide an output signal indicative of the presence of a signal on one of the conductors 3, 7, 11 or 15. Nand gates 47*a*, 47*b*, 47*c*, 47*d* nand the outputs of nor gates 43*a*–43*d*, respectively, via inverters 48.**

In addition, the nand gates **47*b*–47*d* nand the respective outputs of the preceding nor gates 43*a*–43*c*, as shown in FIG. 4. The outputs of the nand gates 45*a*–45*d* and 47*a*–47*d* are connected to respective inverters 49**, which produce the inverted output control signals SB, SC, SD, SE = SE', *va*, *vb*, *vc*, *vd*. Nor gate 401 nors signals SB, SC, SD and SE. Nor gate 402 nors signals SC, SD, SE, and nor gate 403 nors the signals SD, SE. Each of the nor gates 401–403 are connected to inverters 404–406, respectively. Inverters 404–406 provide the control signals SB', SC', SD', respectively, which are fed to the energizers 40B, 40C, and 40D, respectively. Control signal SA=Sa' is fed to the energizer 40A and control signal SE' is fed to the energizer 40E.

Control signals *va*, *vb* and *vc* are commonly fed to the energizers 40B–40E in parallel. Signal *vd* is fed to inputs of the nor gates 407, 408 and 409. Nor gate 407 nors the output of inverter 405 with the output of inverter 406 and the signals SE' and *vd*. Nor gate 407 provides a control signal B*vd* via inverter 410, which is fed to the energizer 40B. Likewise, nor gate 408 nors the output signals of inverter 406, signals SE and *vd* and provides a control signal C*vd* at the output of its respective inverter 411. Signal C*vd* is fed to the energizer 40C. Similarly, nor gate 409 nors the signals SE' and *vd* so as to provide a control signal D*vd* at the output of its associated inverter 412. Signal D*vd* is fed to the energizer 40D. The energizer 40E is controlled by the control signals *va*, *vb*, *vc*, *vd* and the control signal SE'.

The A energizer 40A is shown schematically in FIG. 5, as including a pair of commonly ganged electronic switches 413, which are controlled by the control signal SA. The switches are normally opened and when closed by the signal SA provide the reference voltage of level V*x* from a voltage source indicated by the battery 414. The voltage is applied across the conductors 66, 67 associated with the section 60A with the polarity indicated in FIG. 5.

For sake of clarity, only the B energizer 40B is shown in detail in FIG. 5. It should be understood that the energizers 40C–40E are similarly configured. Energizer 40B has a pair of voltage sources generally indicated by the reference numbers 415 and 416, which provide the aforementioned levels E1–E4 and W1–W4, respectively. For sake of clarity, only the voltage source 415 is shown in detail in FIG. 5. Voltage source 415 is schematically shown as four individual batteries 415A–415D, which provide the respective voltage levels E1–E4. The positive terminals for the batteries 415A–415D are connected to schematically shown electronic switches 415*a*–415*d*, respectively, which are normally open. The electronic switches 415*a*–415*d* are actuated by the control signals, B*va*, B*vb*, B*vc*, and B*vd*, respectively. When closed, the particular electronic switches 415*a*–415*d* connect the positive terminal of the particular battery to which it is connected to the conductor 69 via isolation amplifier circuitry 417. Simultaneously, the schematically shown electronic switch 416*e* is actuated by the control signal Beg to connect the conductor 68 to a ground level EG derived from a common ground. As a result, the negative voltage is applied across the conductors 69 and 68.

In a similar manner, the voltage levels W1–W4 or opposite polarity can be selectively applied to the conductor 68 via the respective schematically shown normally opened electronic switches 416*a*–416*d* and isolation amplifier circuitry 418. Switches 416*a*–416*e* are actuated by the control signals B*va*', B*vb*', B*vc*', B*vd*', Beg, respectively. When one of the switches 416*a*–416*d* is actuated, switch 415*e* is actuated by control signal B*wg* to apply the grounded reference level WG to conductor 69.

Control signals for the electronic switches 415*a*–415*e* and 416*a*–416*e* are provided by the logic circuitry 420, which includes a series of nand gates 421–425, and 421'–425' and their respective inverters 426. Nand gates 421–423 nands the signals V*a*, V*b*, V*c*, respectively, and control signals SB' and E*r*, the latter being derived from the aforementioned data bit B13 and operational code bits B1–B4, hereinafter described. Nand gate 424 nands signals Bvd, SB' and E*r*. Nand gate 425 nands signals SB' and W*r*, the latter being also derived from the data bit B13. Nand gates 421'–423' nand the control signals *va*–*vc*, respectively, with the control signals SB' and W*r*. Nand gate 424' nands the control signals B*vd*, SB', and W*r*. Nand gate 425' nands the control signals SB' and E*r*.

Energizer circuits 40C–40E are configured in a similar manner as the energizer circuit 40B. It should be understood that the signals W*r*, E*r* are fed commonly to the energizer circuits 40B–40E. Moreover, it should be understood that energizers 40C–40E are control signals SC'–SE', respectively, in place of the signal SB' shown in FIG. 5. Also, energizer circuits 40C and 40D use the control signals C*vd* and D*vd*, respectively, in lieu of the signal B*vd* used in energizer circuit 40B. Energizer 40E uses the control signal *vd* directly in lieu of the signal B*vd* used in energizer 40B.

Figure 8:
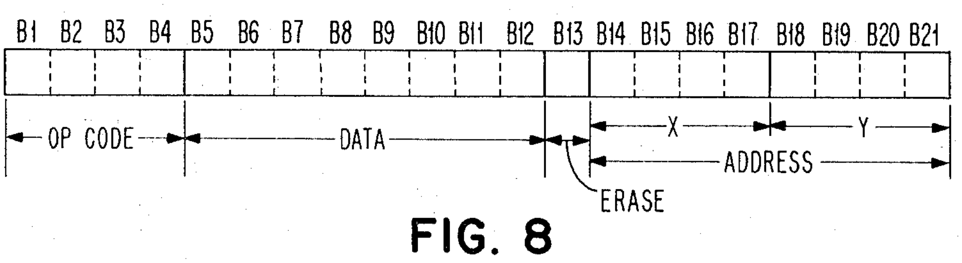
FIG. 8 is a diagram of an exemplary data bit code register format useful in the explanation of the apparatus of FIG. 1.
Figure 6:
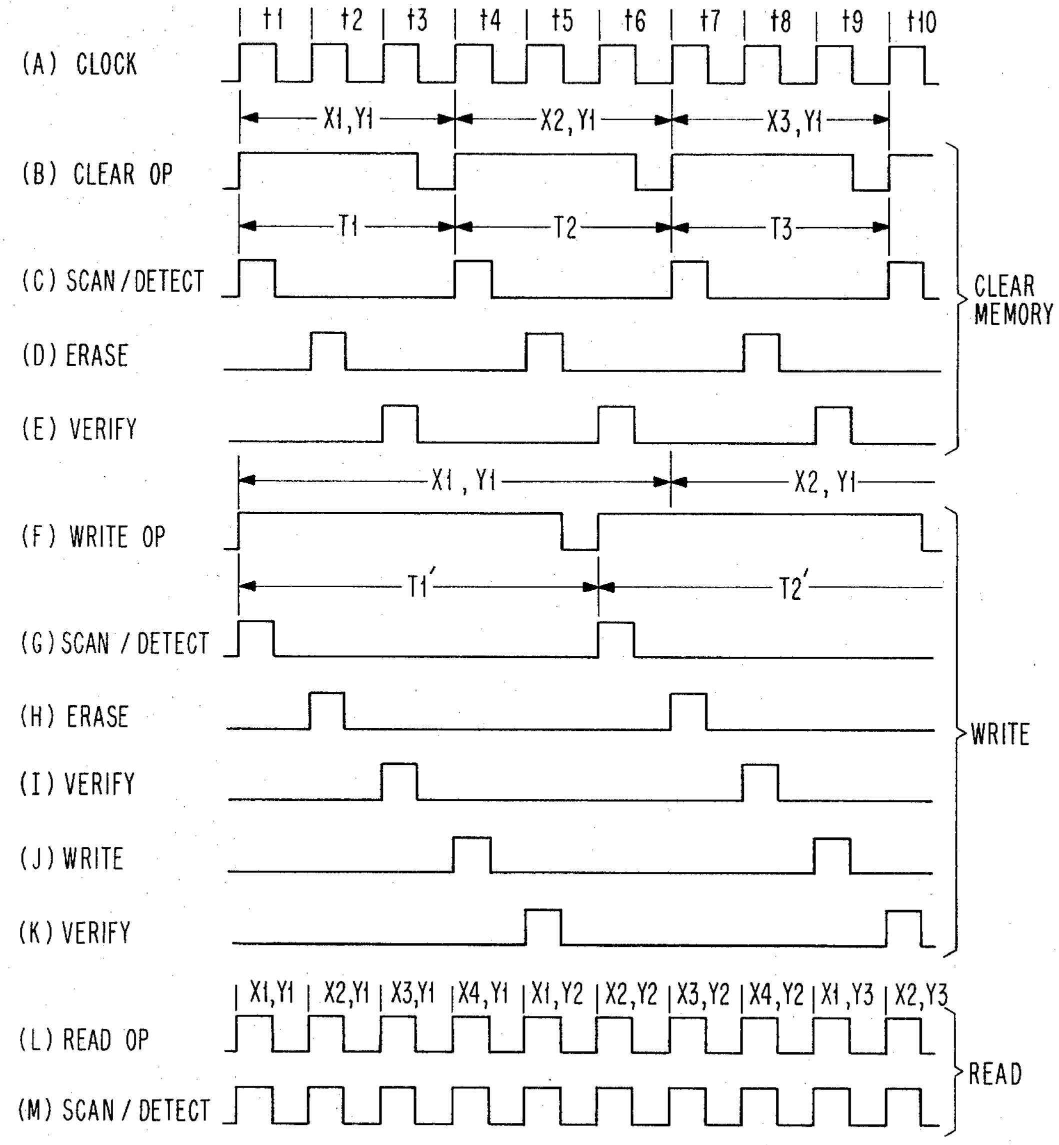

Referring now to FIGS. 6 and 8, three operational modes referred to as CLEAR MEMORY, WRITE, and READ will next be described. By way of example, it is assumed that a 21-bit position code register format, cf. FIG. 8, is used to transmit data from the aforementioned CPU to the optical memory system of FIG. 1. As shown in FIG. 8, bit positions B1–B4 are assigned to the particular operation to be performed. Bits B5–B12 represent the data information to be stored by the optical memory system. For sake of simplicity, the data bits B5–B8 are assigned to the storage means 60 shown in FIG. 1. It should be understood that additional storage means, not shown, with accompanying scanning and detection optics and associated energizing and control circuitry may be provided for storing the data bits B9–B12 in corresponding address locations, if desired. Data bit B13 is the erase bit and from it is derived the aforementioned erase and write control signals E*r* and W*r*, respectively, which are fed to the energizers 40B–40E. Bits B14–B21 contain the address information for the light beam scanner 20. Bits B14–B17 are assigned to the X location data bits being fed to the scanner energizer and control circuitry 30 *via* multiconductor cable 33X, cf. FIG. 1. Bits B18–B21 are the Y address bits being fed to circuitry 30 via the multiconductor cable 33Y.

Referring to FIG. 6, waveform A is the basic clock cycle and which can be derived from the clock signal associated with the aforementioned CPU, not shown. The basic cycle, waveform A, is commonly used with three aforementioned operational modes. Waveforms B, C, D and E are associated with the operational mode referred to as CLEAR MEMORY. In this operational mode, each storage location associated with the storage means 60 is cleared. Accordingly, the data bits B1–B4 are at an appropriate code indicative of the clear operation. Data bits B5–B12 are at their binary zero levels and the data bit B13 is an up or erase level. During the first CLEAR operation cycle time Tl, cf. waveform B, the bits B14–B17 corresponding to the X1 location are provided and bits B18–B21 corresponding to the Y1 coordinate location are provided. As a result, the light beam 20L illuminates the X1, Y1 storage location of the storage means 60. Assuming that some information has been previously stored in this location, it is detected by the detecting means 50. For example, assuming that the information corresponds to the number 6, then the associated X1, Y1 storage regions of the ferroelectric layers 63 associated with the sections 60B and 60C will have residual or remnant birefringent levels of $\overline{\Delta n4}$ and $\overline{\Delta n3}$, respectively, cf. FIG. 7. The birefringent levels of the X1, Y1 storage regions of the layers 60D and 60E will be at zero levels. Consequently, when the light passes through the storage means 60 at location X1, Y1, its spectral content will correspond to the number stored in the location and will be detected by the appropriate one of the diodes 53. Encoder 52 encodes the resultant diode electrical signal and stores it in a temporary buffer register, not shown, and which is connected to the inputs D1–D4 of selector switch 50'. This occurs in the first time period t1 of the basic clock cycle, cf. waveform A.

During the next basic period *t*2, lighter scanner 20 is again energized turning on the light beam 20L. The selector switches connected to the inputs D1–D4 are actuated by the control signal B13' and fed to the inputs $2^0$–$2^2$ of the demultiplexer 42. For the given example, its output line 6 is placed in the up condition and is nored by the nor gates 43*b* and 44*c*, respectively. As a result, the erase energizing voltage pulses of levels E4 and E3 will appear at the output of energizers 40B and 40C, respectively, thereby reducing the aforementioned residual birefringent levels Δn4 and Δn3, respectively, to a zero level, cf. FIG. 7. Thus, the storage location X1, Y1 of storage means 60 is cleared.

In the preferred mode of operation, during the next basic time period *t*3, the storage location is again scanned to determine if it has been cleared. Accordingly, the light scanner 20 is again energized during time period *t*3 and the spectral content of the light beam passing through the storage location X1, Y1 is detected by the appropriate diode 53 which has a spectral response compatible to the color assigned to the zero information level. During this third time period *t*3, the comparator 80 compares the output of encoder 52 with the encoded bits B5–B8, which are at down levels, and if no correction is required the light scanner 20 positions the light beam 20L to the next storage location, X2, Y1, during the next basic time period *t*4 and begins the next CLEAR operation cycle T2. If an error has been detected, then the aforementioned self-correcting circuitry provides control signals to the energizer circuitry 40 to erase, that is, provide an erase pulse or pulses of the appropriate erase energizing level or levels to the particular one or ones of the energizers 40B–40E so as to reduce the residual birefringent levels of their particular associated ferroelectric layers 63 to a zero level. Then the storage location X1, Y1 is again recycled with the operations associated with the waveforms C, D and E. The aforedescribed CLEAR operation process is repeated in sequence for each storage location in the storage means 60.

In performing a write operation, cf. waveforms F–K, the data bits B1–B4 are appropriately coded. The writing operation cycle period T' is extended. During the write operation, each storage location is first scanned and detected, then erased, and if desired, the erasure is verified, and then the write operation follows. If desired, the write operation is also verified.

Operations associated with the erase and its verification, cf. waveforms G–I, are identical to those described in the CLEAR MEMORY operation and the corresponding associated waveforms C, D and E. Hence, they will not be repeated for sake of brevity.

For sake of explanation, let it be assumed that the previous information in the X1, Y1 location has been properly erased, that is cleared, at the end of the third basic time clock cycle t3. Then during the next time period *t*4, the scanner 20 is again turned on.

During write cycle period *t*4, light scanner 20 is energized and light beam 20L illuminates the storage region associated with location X1, Y1 of means 60. The impedance of the adjacent illuminated regions of the photoconductor layers 63 is induced. Thus, if write energizing pulses of the appropriate write levels W1–W4 are present from the energizers 40B–40E, then upon their removal, the particular ferroelectric layer 63 in the particular storage region associated with location X1, Y1 will have the corresponding one of the residual birefringent levels $\overline{\Delta n1}$–$\overline{\Delta n4}$, respectively.

Assuming that the number 6 is desired to be stored in the X1, Y1 location, during this fourth time cycle t4 selector switch 41 connects the data bits B5–B8 to the demultiplexer 42 and the write control signal Wr is in its up position. As a result, control signals are generated by the circuitry 40 which causes the energizer 40B and 40c to generate write energizing pulses of level W4 and W3, respectively, which are applied across the conductors 68, 69 and 70, 71, respectively. As a result, when the energizing pulses are removed, the regions of ferroelectric layers 63 associated with sections 60B and 60C will be at residual birefringent levels Δn4 and Δn3, respectively.

During the next time period t5, scanner 20 is again energized and light beam passes through the storage location X1, Y1 of means 60. As a result of the newly-induced residual birefringent levels in the ferroelectric layers 63 of sections 60B and 60C, the appropriate diode 53 detects that the number 6 is recorded in that storage location. If there is a discrepancy, then the self-correcting circuitry, not shown, of comparator 80 provides the necessary adjustment. Whereupon, the write verify cycle, cf. waveform K may be repeated in the next succeeding basic time period, i.e. time period *t*6, for the storage location X1, Y1. Once the correct information has been stored, the overall write operation cycle, cf. waveforms G–K is repeated for the next storage location X2, Y1, and the information to be stored therein.

For read operation, the read operation cycle is coincident with the basic clock cycle, cf. waveforms L and A. During each read operation cycle *t*1, *t*2, etc. the scanner 20 is energized and the information stored in the particular storage location being scanned is read out by the detecting means 50. During the read operation, both control signals W*r* and E*r* are maintained at down levels thereby inhibiting the actuation of energizing circuits 40B–40E.

As aforementioned, preferably the optical memory system verifies the information it is storing. However, the verification cycles may be omitted, if it is desired to speed up the operating time. As can be readily appreciated by those skilled in the art, the optical memory system of the present invention can be used in a sequential manner and/or as an alterable read only memory. The system also has non-volatile and nondestructive characteristics. Moreover, because the storage means 60 is a multilayer configuration of ferroelectric members, the switching voltages for energizing it are correspondingly reduced.

While the invention has been particularly shown and described with reference to the preferred embodiment, it will be understood by those skilled in the art that various changes in form and detail may be made therein without departing from the spirit and scope of the invention.

We claim:

1. Optical memory system apparatus comprising in combination:

optical storage means having plural storage locations for storing digital information therein, said storage means including a plurality of spaced conductive members and a plurality of ferroelectric member means interleaved therebetween, each of said storage locations including a mutually exclusive discrete region in each of said ferroelectric member means, and each storage location having said regions thereof in a predetermined optical coupling relationship with each other;

means for selectively setting the birefringent level in the storage regions of each ferroelectric member means, the birefringent levels set for the regions of each particular storage location providing a spectral characteristic indicative of digital information to be stored in the particular storage location;

and detecting means for optically detecting the spectral characteristic of the regions associated with each storage location to determine the digital information stored therein.

2. Optical memory system apparatus according to claim 1 wherein said means for selectively setting the birefringent level further comprises:

light scanner means for providing a polarized collimated light beam for scanning the storage locations of said optical storage means in a predetermined manner, and energizer means for selectively energizing said conductive members in co-action with said light beam of said light scanner to provide said setting of said birefringent levels.

3. Optical memory system according to claim 2 wherein said storage means further comprises analyzer means for analyzing said polarized light beam passing therethrough.

4. Optical memory system according to claim 2 wherein said light scanner means further comprises:

plural spaced ferroelectric layer members, each of said ferroelectric layer members having disposed in an orthogonal relationship with respect to each other first and second sets of plural parallel conductors.

5. Optical memory system apparatus comprising in combination:

optical storage means having plural storage locations, said optical storage means having a plurality of sections, each of said sections comprising in sequence first, second and third conductive layers, and a ferroelectric fourth layer interleaved between said first and second layers, said second layer being of the photoconductive type, each of said storage locations including a mutually exclusive discrete region in each of said ferroelectric layers, and each storage location having said regions thereof in a predetermined optical coupling relationship with each other, means selectively coupled to said first and third conductive layers for selectively setting the birefringent level in the storage region of each ferroelectric layer, the birefringent levels set for the regions of each particular storage location providing a spectral characteristic indicative of the digital information to be stored in the particular storage location, and detecting means for optically detecting the spectral characteristic of the regions associated with each storage location to determine the digital information stored therein.

6. Optical memory system apparatus according to claim 5 wherein said means for selectively setting the birefringent level further comprises:

a light scanner for providing a polarized collimated light beam for scanning the storage locations of said optical storage means in a predetermined manner, and energizer means for selectively energizing said conductive layers in co-action with said light beam of said light scanner to provide said setting of said birefringent levels.

7. Optical memory system according to claim 6 wherein said storage means further comprises analyzer means for analyzing said polarized light beam passing therethrough.

8. Optical memory system according to claim 6 wherein said light scanner means further comprises:

plural spaced ferroelectric layer members, each of said ferroelectric layer members having disposed in an orthogonal relationship with respect to each other first and second sets of plural parallel conductors.

* * * * *